(12) United States Patent
Yoshimura et al.

(10) Patent No.: US 8,138,885 B2
(45) Date of Patent: Mar. 20, 2012

(54) VEHICLE ANTENNA DEVICE, VEHICLE INCLUDING THE VEHICLE ANTENNA DEVICE, AND VEHICLE SECURITY SYSTEM INCLUDING THE VEHICLE ANTENNA DEVICE

(75) Inventors: Kentaro Yoshimura, Wako (JP); Naoto Yamamoto, Wako (JP); Hideaki Arai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1125 days.

(21) Appl. No.: 11/516,721

(22) Filed: Sep. 6, 2006

(65) Prior Publication Data

US 2007/0222557 A1 Sep. 27, 2007

(30) Foreign Application Priority Data

Sep. 14, 2005 (JP) .................... 2005-266511

(51) Int. Cl.
*G05B 19/00* (2006.01)
*B60R 25/00* (2006.01)

(52) U.S. Cl. ............... 340/5.72; 340/5.61; 340/10.34; 340/10.2; 343/713

(58) Field of Classification Search ............... 340/10.34, 340/5.61, 5.72, 10.2, 10.5, 426.1, 426.11–426.36; 343/742, 867, 741
See application file for complete search history.

(56) References Cited

U.S. PATENT DOCUMENTS

| | | | |
|---|---|---|---|
| 4,849,749 A * | 7/1989 | Fukamachi et al. | 340/5.66 |
| 5,945,906 A * | 8/1999 | Onuma | 340/5.62 |
| 6,239,753 B1 * | 5/2001 | Kado et al. | 343/702 |
| 6,400,040 B1 * | 6/2002 | Scudder et al. | 307/10.2 |
| 2005/0287846 A1 * | 12/2005 | Dozen et al. | 439/85 |
| 2006/0290468 A1 * | 12/2006 | Hidaka et al. | 340/5.61 |

FOREIGN PATENT DOCUMENTS

JP 09-275360 10/1997

* cited by examiner

*Primary Examiner* — Brian Zimmerman
*Assistant Examiner* — Omer S Khan
(74) *Attorney, Agent, or Firm* — Ditthavong Mori & Steiner, P.C.

(57) ABSTRACT

A vehicle antenna device includes a first antenna and a second antenna. The first antenna surrounds an ignition key cylinder having a key insertion hole and is configured to receive a first signal transmitted from a first transmitter in a key insertion state where a key is inserted into the key insertion hole. The second antenna is configured to receive a second signal transmitted from a second transmitter. The first antenna is positioned between the first transmitter and the second antenna in the key insertion state.

12 Claims, 7 Drawing Sheets

VEHICLE ANTENNA DEVICE, VEHICLE INCLUDING THE VEHICLE ANTENNA DEVICE, AND VEHICLE SECURITY SYSTEM INCLUDING THE VEHICLE ANTENNA DEVICE

CROSS-REFERENCE TO RELATED APPLICATIONS

The present application claims priority under 35 U.S.C. §119 to Japanese Patent Application No. 2005-266511, filed Sep. 14, 2005, entitled "VEHICLE ANTENNA DEVICE." The contents of this application are incorporated herein by reference in their entirety.

BACKGROUND OF THE INVENTION

1. Field of the Invention

The present invention relates to a vehicle antenna device, a vehicle including the vehicle antenna device, and a vehicle security system including the vehicle antenna device.

2. Discussion of the Background

An immobilizer system and a keyless entry system for vehicles are well known. The immobilizer system is a system in which the driver can start the engine of a vehicle with an ignition key only when the ignition key is authentic with respect to the vehicle. The keyless entry system is a system in which the driver can lock or unlock the door of the vehicle by remote control without using the ignition key.

In the immobilizer system, when the ignition key having a first transmitter built in the grip is inserted into a key cylinder of the vehicle and turned to a position, a first antenna in the vehicle receives a first signal via LF waves (e.g., from 100 kHz to 200 kHz) from the first transmitter, and the received first signal is output to the electric control unit (ECU) of the immobilizer system. The ECU starts the engine only when a first ID code in the input first signal matches a first ID code stored in advance.

In the keyless entry system, when the driver carrying a remote controller with a built-in second transmitter is within a specified range from the vehicle, a second antenna in the vehicle receives a second signal via RF radio waves (e.g., 314.9 MHz) from the second transmitter, and the received second signal is output to the ECU of a door lock device. The ECU locks or unlocks the door when a second ID code in the input second signal matches a second code stored in advance.

When the immobilizer system and the keyless entry system are applied to the same vehicle, the systems are installed separately or as one system in the vehicle, while the first and second antennas are disposed physically apart from each other.

Japanese Unexamined Patent Application Publication No. 9-275360 discloses that a ground conductor is provided on a rear of a printed circuit board and a signal processing circuit section including a transmission reception circuit is provided to a front side. A loading coil is mounted between a print pattern of the signal processing circuit section provided on the front side of the printed circuit board and a print pattern of an antenna. Furthermore, a part perpendicular to the printed circuit board of the antenna is extended from the print pattern of the antenna provided to the front side of the printed circuit board and a part of the antenna in parallel with the printed circuit board is extended from the tip of the part perpendicular to the printed circuit board of the antenna. The contents of this publication are incorporated by reference in their entirety.

SUMMARY OF THE INVENTION

According to one aspect of the present invention, a vehicle antenna device includes a first antenna and a second antenna. The first antenna surrounds an ignition key cylinder having a key insertion hole and is configured to receive a first signal transmitted from a first transmitter in a key insertion state where a key is inserted into the key insertion hole. The second antenna is configured to receive a second signal transmitted from a second transmitter. The first antenna is positioned between the first transmitter and the second antenna in the key insertion state.

According to another aspect of the present invention, a vehicle includes an ignition key, a first antenna and a second antenna. The ignition key cylinder has a key insertion hole. The first antenna surrounds the ignition key cylinder and is configured to receive a first signal transmitted from a first transmitter in a key insertion state where a key is inserted into the key insertion hole. The second antenna is configured to receive a second signal transmitted from a second transmitter. The first antenna is positioned between the first transmitter and the second antenna in the key insertion state.

According to further aspect of the present invention, a vehicle security system includes an ignition key cylinder having a key insertion hole, a first transmitter configured to transmit a first signal, a second transmitter configured to transmit a second signal, a first antenna and a second antenna. The first antenna surrounds the ignition key cylinder and is configured to receive the first signal transmitted from the first transmitter in a key insertion state where a key is inserted into the key insertion hole. The second antenna is configured to receive the second signal transmitted from the second transmitter. The first antenna is positioned between the first transmitter and the second antenna in the key insertion state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
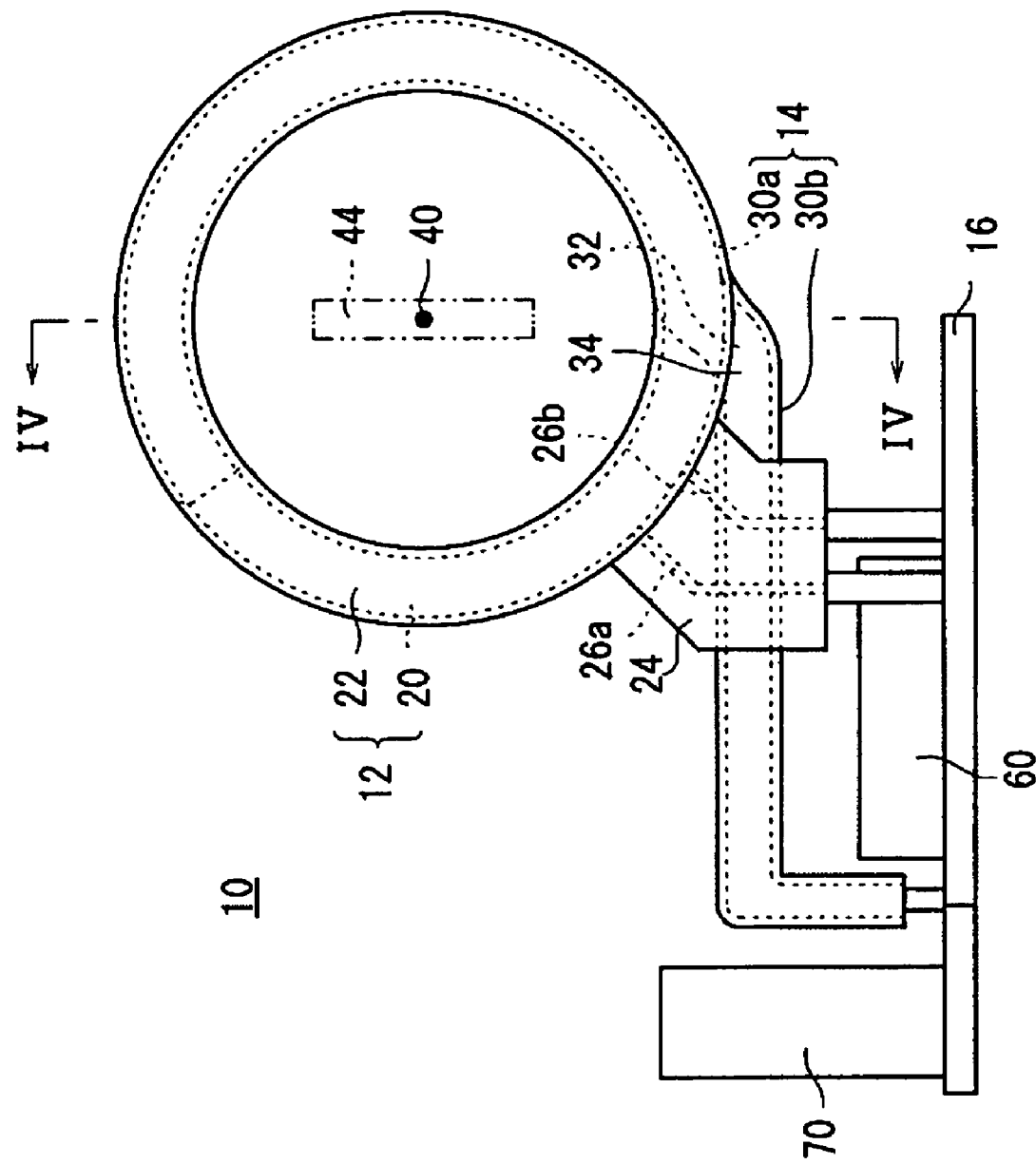
FIG. 1 is a front elevational view of a vehicle antenna device according to an embodiment of the present invention.

The embodiments will now be described with reference to the accompanying drawings, wherein like reference numerals designate corresponding or identical elements throughout the various drawings.

Figure 2:
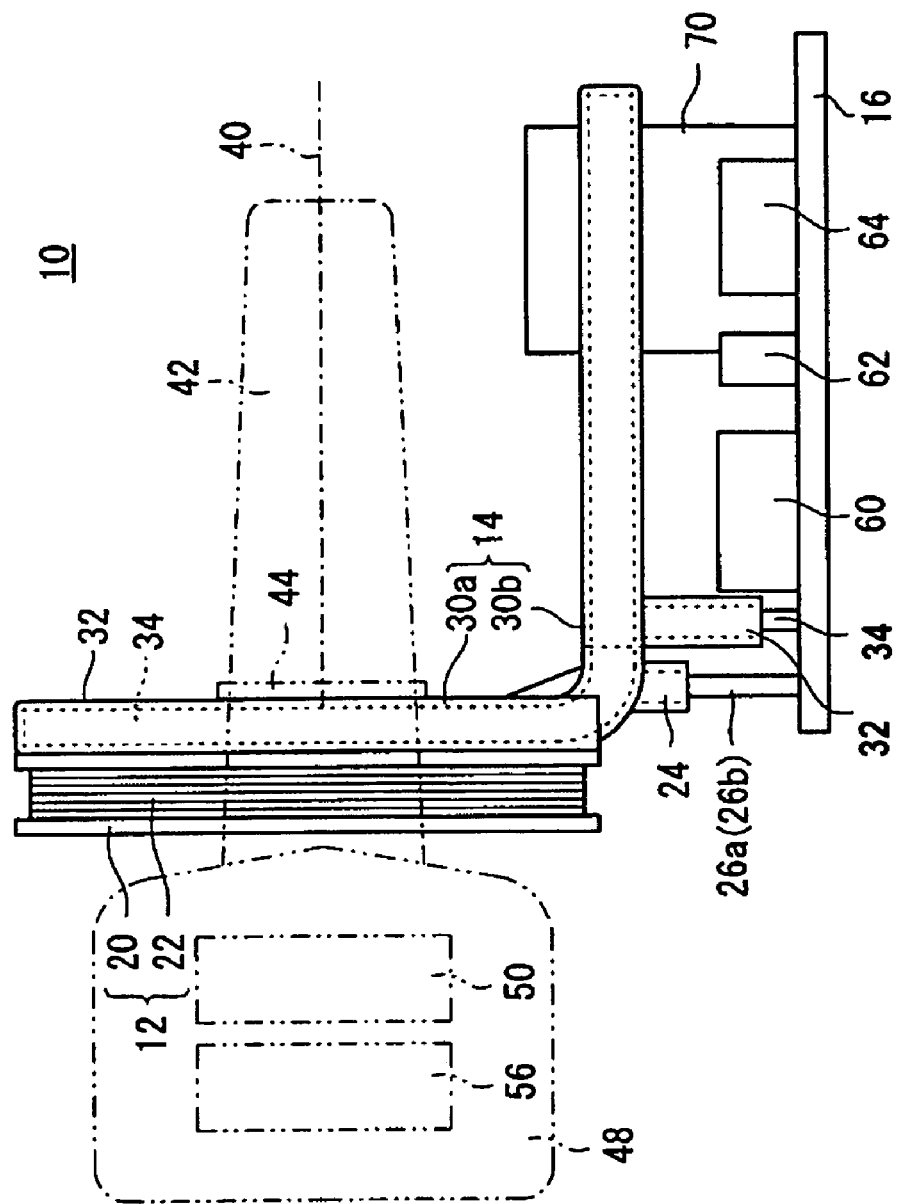
FIG. 2 is a side view of the vehicle antenna device as shown in FIG. 1.
Figure 3:
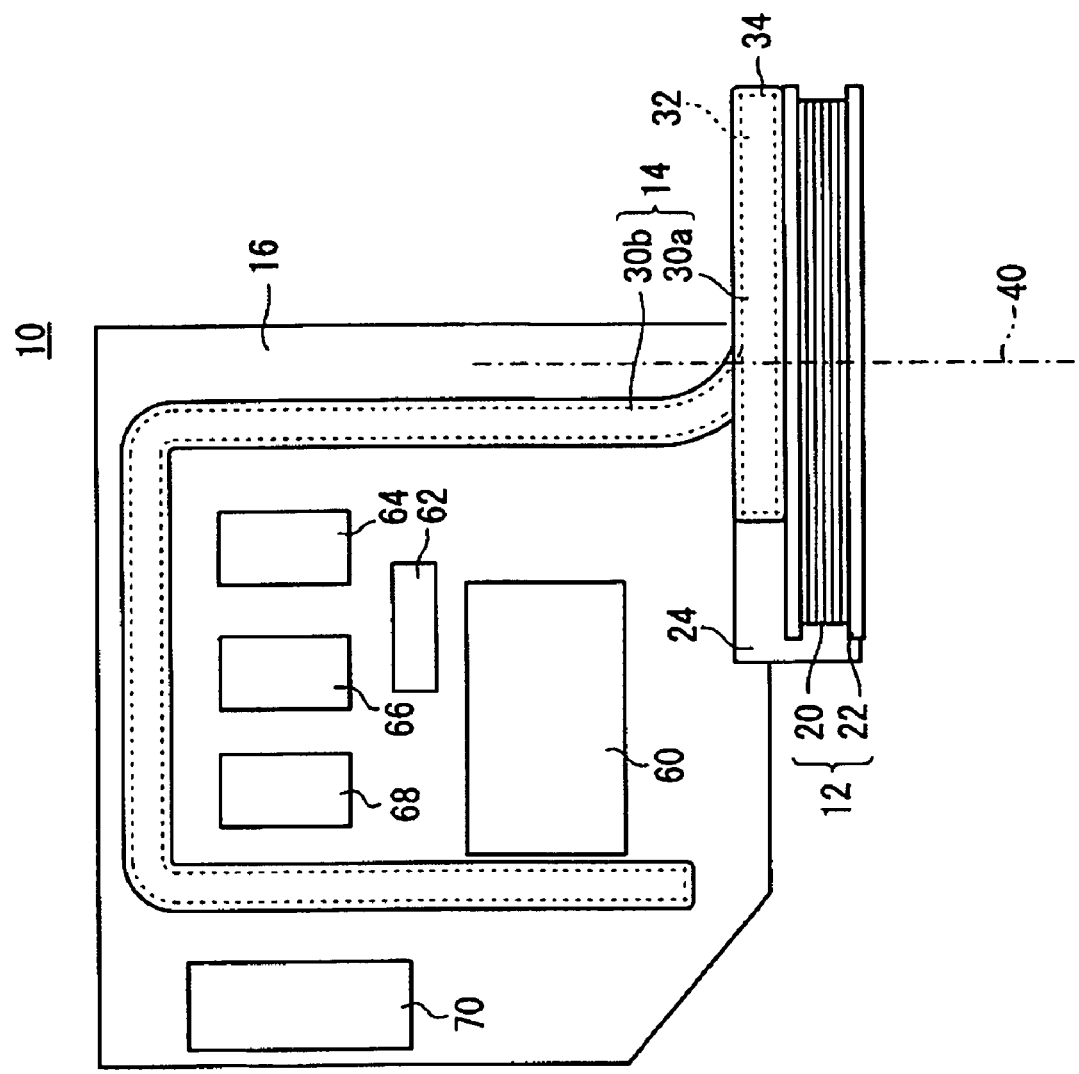
FIG. 3 is a plan view of the vehicle antenna device as shown in FIG. 1.
Figure 4:
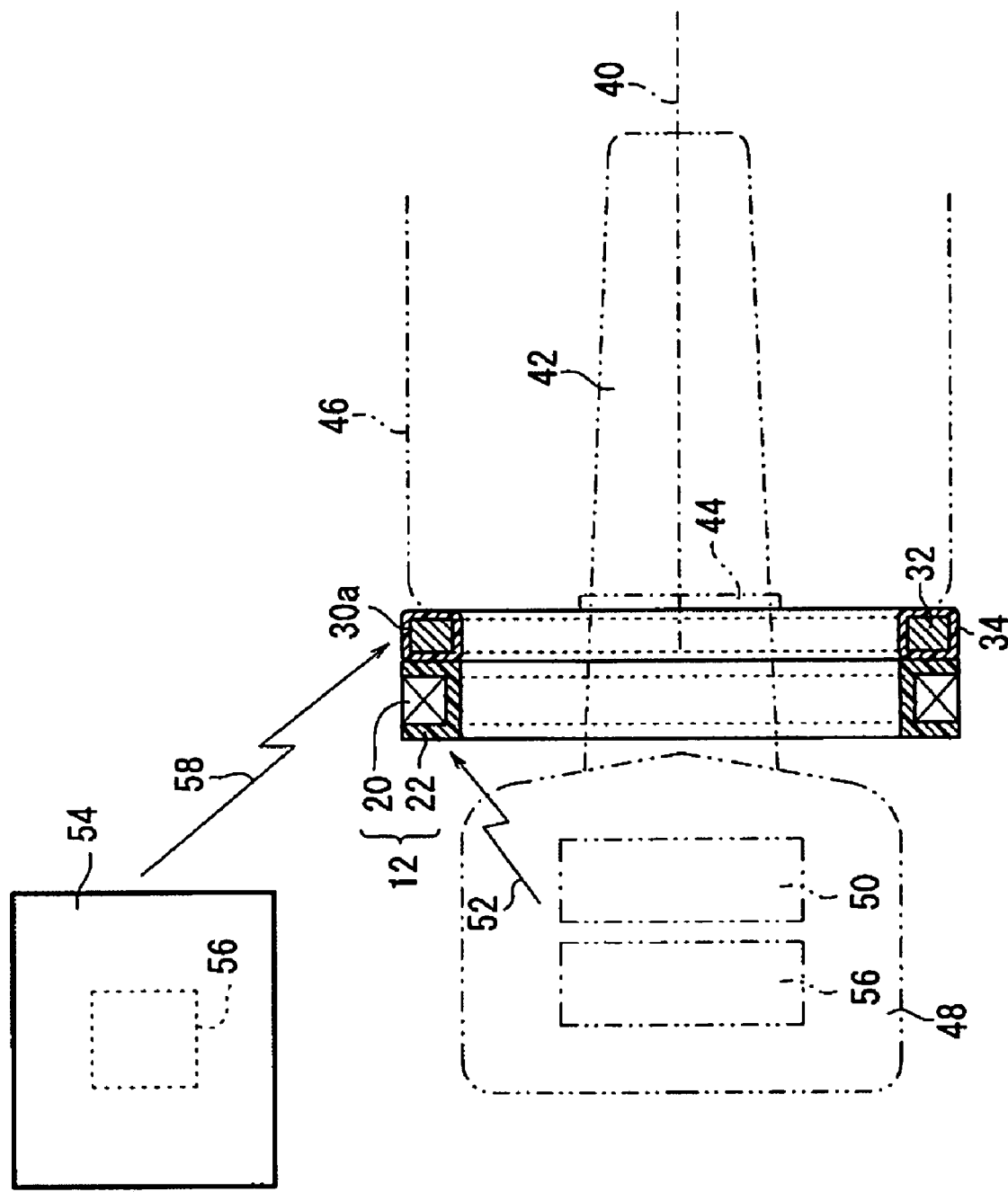
FIG. 4 is a cross-sectional view taken along the line IV-IV of FIG. 1.
Figure 5:
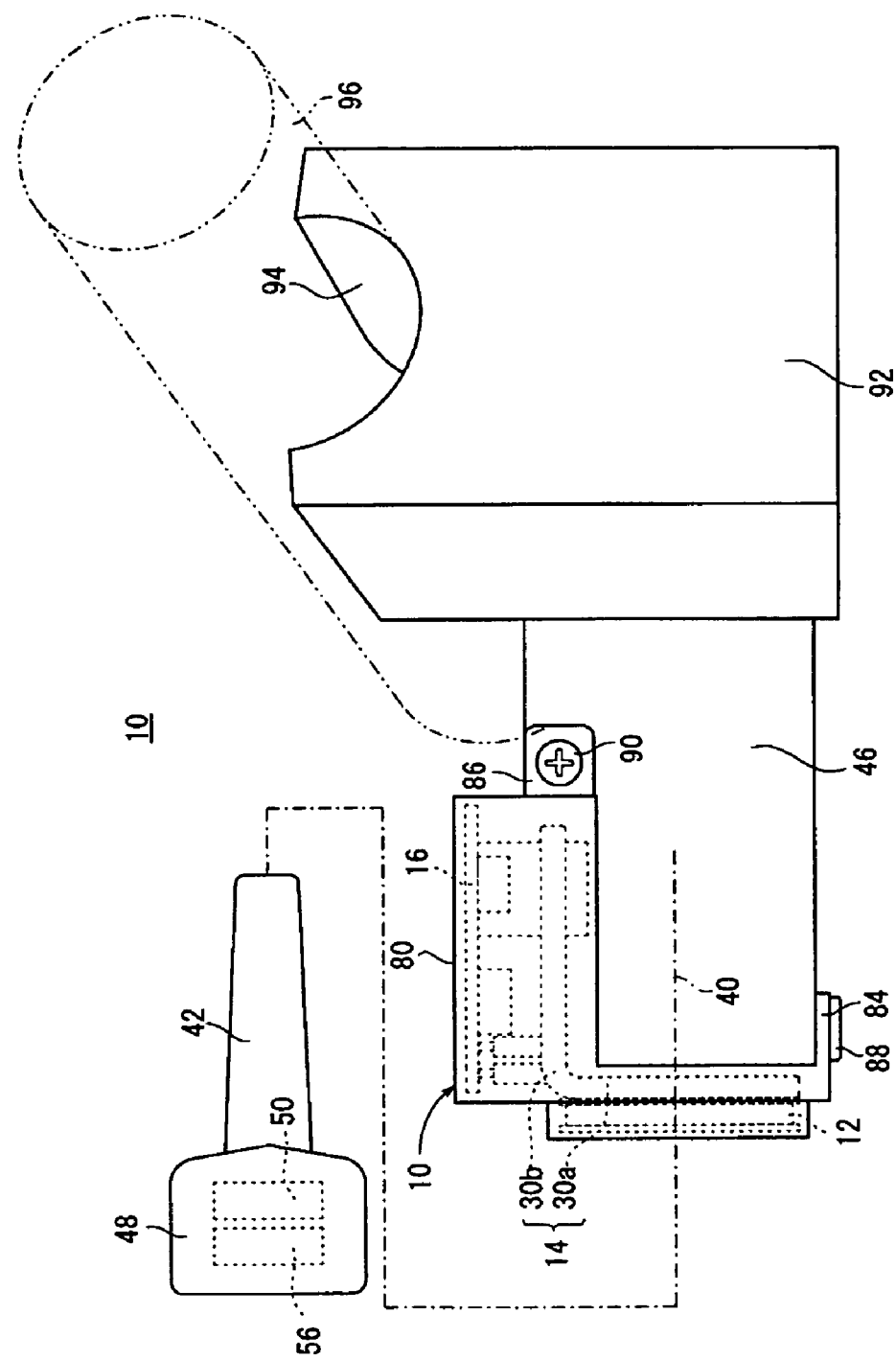
FIG. 5 is a view of the vehicle antenna device of FIG. 1 installed in a vehicle.
Figure 6:
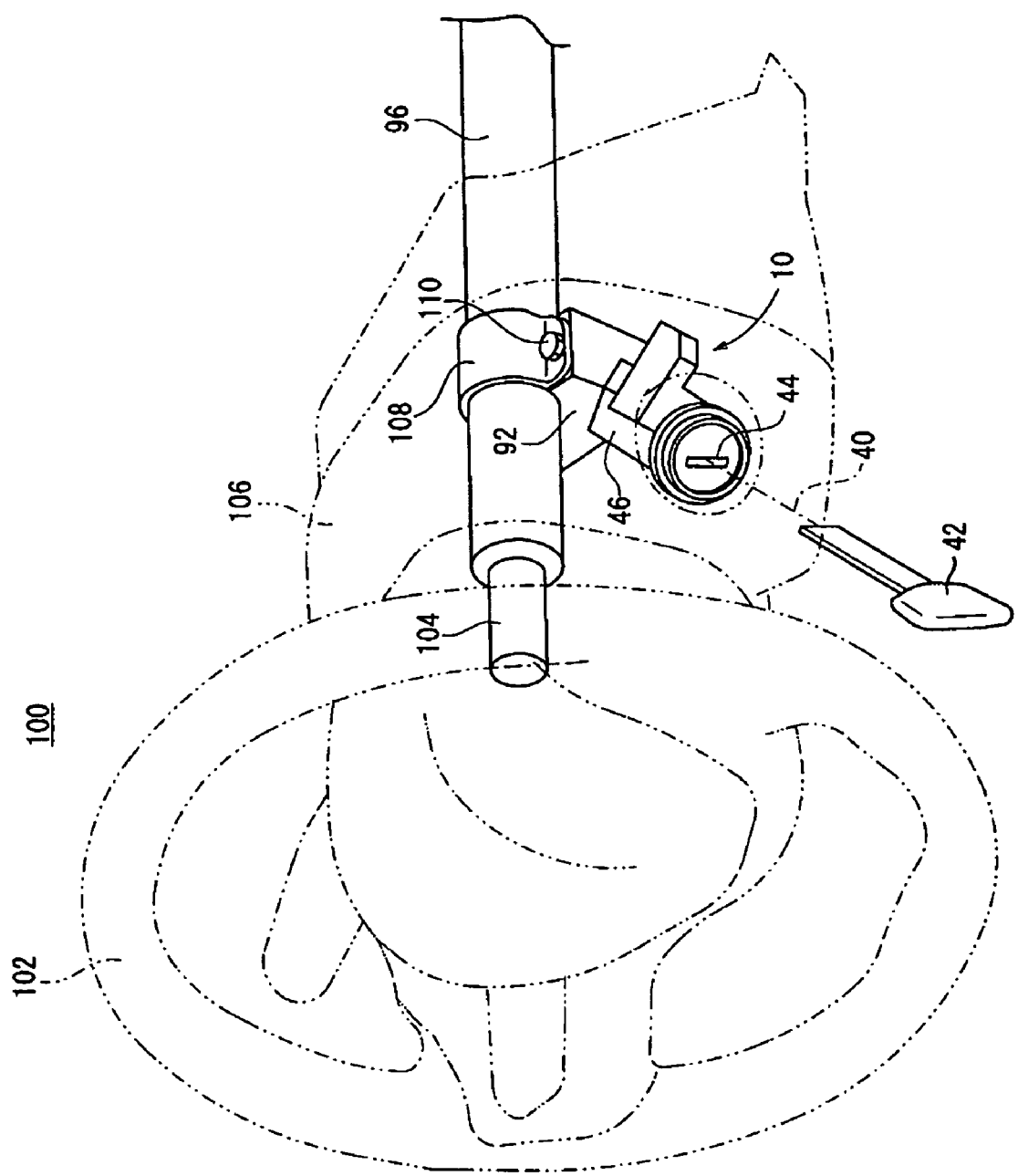
FIG. 6 is a perspective view of the vehicle antenna device of FIG. 1 installed in the vehicle.
Figure 7:
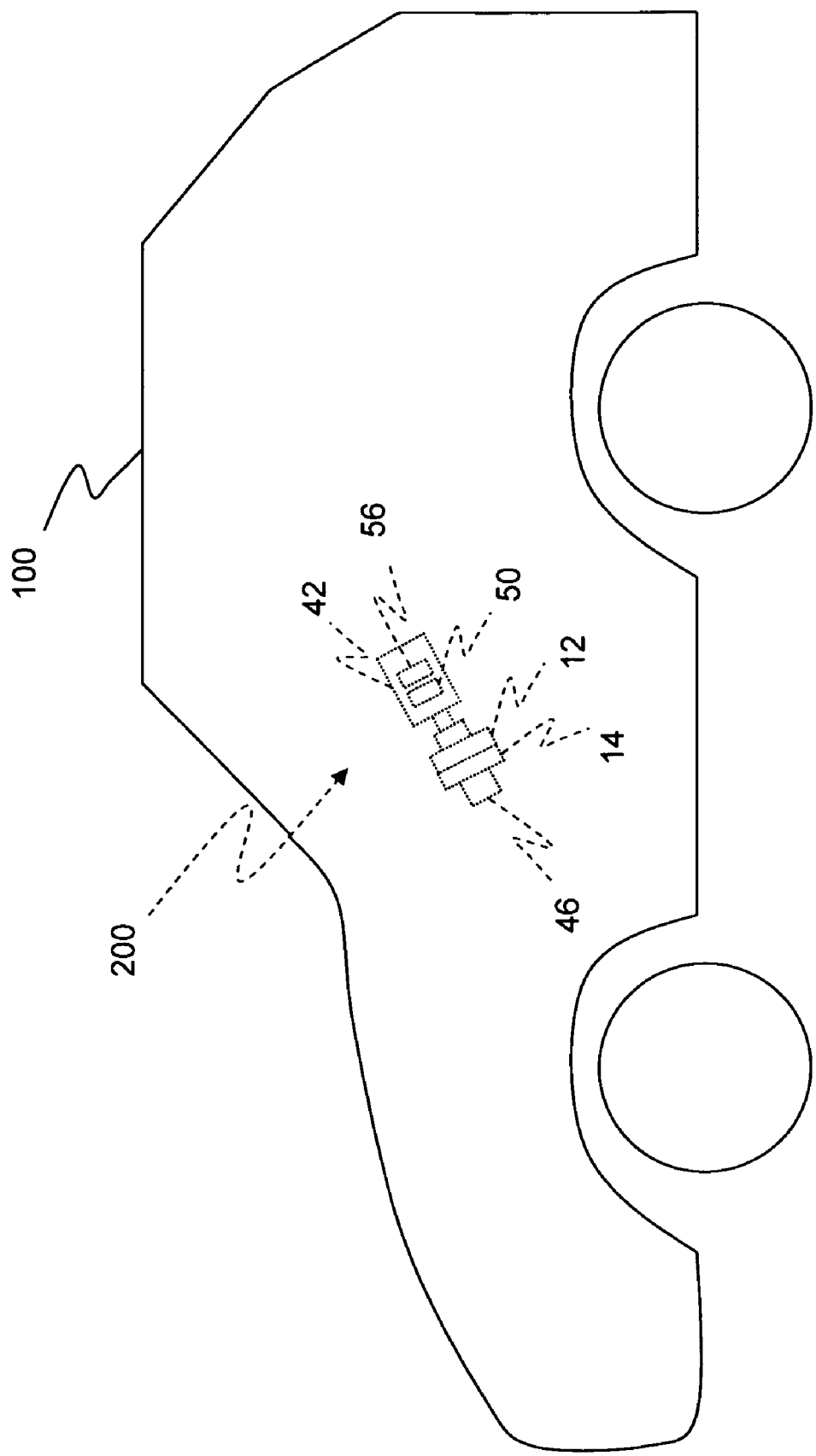
FIG. 7 is a schematic view of a vehicle and vehicle security system including the vehicle antenna device as shown in FIG. 1.

FIG. 1 is a front view of the main structure of a vehicle antenna device 10 according to an embodiment of the present invention. FIG. 2 is a side view of the main structure of the vehicle antenna device 10. FIG. 3 is a plan view of the main structure of the vehicle antenna device. FIG. 4 is a cross-sectional view taken along the line IV-IV of FIG. 1. FIG. 5 is a side view of the vehicle antenna device 10 installed in a vehicle 100. FIG. 6 is a perspective view of the vehicle antenna device 10 installed in the vehicle 100. FIG. 7 is a schematic view of a vehicle and vehicle security system including the vehicle antenna device as shown in FIG. 1.

Referring to FIG. 7, a vehicle 100 includes an ignition key cylinder 46, a first antenna 12, and a second antenna 14. The first antenna 12 is positioned between the first transmitter 50 and the second antenna 14 in the key insertion state where the key 42 is inserted in the key cylinder 46. A vehicle security system 200 includes an ignition key cylinder 46, a first transmitter 50, a second transmitter 56, a first antenna 12, and a second antenna 14.

Referring to FIGS. 1 to 3, the vehicle antenna device 10 includes the first antenna 12, the second antenna 14 disposed close to the first antenna 12, and a board 16. The first antenna 12 has, for example, a circular shape.

The first antenna 12 includes a circular bobbin 22 made of insulating resin and a coil 20 that is constructed such that a conductor with an insulating coating is wound around the bobbin 22 several times. An insulating resin support 24 extends from the lower part of the first antenna 12 toward the board 16. The support 24 has two electrically conductive members 26a and 26b connected to the opposite ends of the coil 20 and passing through the support 24 into connection with the board 16. Thus, the first antenna 12 is arranged on the board 16 through the support 24 and the electrically conductive members 26a and 26b substantially perpendicular to the surface of the board 16.

The second antenna 14 is constructed such that the surface of an antenna conductor 34 is coated with an insulating resin 32. The second antenna 14 includes a perpendicular part 30a and a horizontal part 30b. The perpendicular part 30a is disposed closed to the first antenna 12 and shaped along the shape of the first antenna 12. The horizontal part 30b is connected to the lower part of the first antenna 12 and extending substantially in U-shape along the board 16 (see FIG. 3) above the board 16 (in FIGS. 1 and 2, above the board 16 and adjacent to the first antenna 12).

The antenna conductor 34 is made of a low magnetic permeability material, such as aluminum.

The basal end of the horizontal part 30b is curved to the surface of the board 16 into connection therewith. Thus, the second antenna 14 is supported above the board 16 by the basal end of the antenna conductor 34, the first antenna 12, and the support 24, and the electrically conductive members 26a and 26b (see FIGS. 1 and 2).

The first antenna 12 and the vertical part 30a of the second antenna 14 are disposed close to each other (see FIGS. 2 to 5), as described above. The coil 20 of the first antenna 12 and the part of the antenna conductor 34 adjacent to the vertical part 30a are separated to have a certain distance and insulated by the resin bobbin 22 and the resin 32. In other words, the first antenna 12 and the vertical part 30a are spaced by the resin bobbin 22 and the resin 32.

The first antenna 12 and the vertical part 30a are disposed above the board 16 in such a manner as to meet the board 16 at right angles (see FIGS. 1, 2, and 5). The first antenna 12 and the vertical part 30a meet the horizontal part 30b at right angles above the board 16. The horizontal part 30b is disposed in parallel with the surface of the board 16.

The vehicle antenna device 10 is disposed close to a key insertion opening 44 of a key cylinder 46 in which an ignition key 42 carried by the driver (not shown) of a vehicle 100 is to be inserted (see FIGS. 4 to 6). In this case, the first and second antennas 12 and 14 are disposed in the vicinity of the key insertion opening 44 in such a manner that the first antenna 12 and the vertical part 30a of the second antenna 14 are substantially coaxial with the central axis 40 of the key insertion opening 44. The central axis 40 extends along the direction in which the ignition key 42 is to be inserted (from the left to the right in FIGS. 2, 4, and 5). In other words, the first antenna 12, the vertical part 30a of the second antenna 14, and the key insertion opening 44 are substantially coaxial with the central axis 40 along the direction in which the ignition key 42 is to be inserted.

The first antenna 12, the vertical part 30a of the second antenna 14, and the key cylinder 46 are disposed in that order on the central axis 40 along the direction in which the ignition key 42 is to be inserted (see FIGS. 4 and 5). On the other hand, a first transmitter 50 for the immobilizer system is disposed in the grip 48 of the ignition key 42 carried by the driver. The first transmitter 50 transmits a first signal to the first antenna 12 via radio waves 52. Thus, when the driver inserts the ignition key 42 into the key insertion opening 44 through the first antenna 12 and the vertical part 30a, the vertical part 30a of the second antenna 14 is not located between the first transmitter 50 and the first antenna 12 (see FIGS. 2 and 4). FIG. 5 shows a state in which the first and second antennas 12 and 14 are disposed below the board 16 in side view.

The board 16 and the horizontal part 30b are arranged in parallel with the central axis 40 (see FIGS. 1, 2, and 5). Furthermore, the center of the first antenna 12 and the center of the vertical part 30a agree with the central axis 40, and the vertical part 30a is disposed along the first antenna 12, as described above. Accordingly, the outside diameter of the first antenna 12 and the outside diameter of the vertical part 30a are substantially equal (see FIGS. 1, 2, and 4). This means that the outside diameter of the vertical part 30a is equal or larger than the outside diameter of the first antenna 12.

The second antenna 14 can receive a second signal from a second transmitter 56 in a remote controller 54 or in the grip 48 of the ignition key 42 carried by the driver via radio waves 58 (see FIGS. 4 and 5).

The first signal is a signal containing a specified first ID code to be transmitted from the first transmitter 50 to the first antenna 12 via the LF radio waves 52 (e.g., from 100 kHz to 200 kHz). The second signal is a signal containing a specified ID code to be transmitted from the second transmitter 56 to the second antenna 14 via the RF radio waves 58 (e.g., 314.9 MHz).

There are a first receiver 64 to which the first signal received by the first antenna 12 is input, a second receiver 60 to which the second signal received by the second antenna 14 is input, a control circuit 62, a storage circuit 66, a supply circuit 68, and a connector 70 on the surface of the board 16 adjacent to the first and second antennas 12 and 14 (see FIGS. 1 to 3).

The supply circuit 68 supplies power to the first receiver 64, the second receiver 60, the control circuit 62, and the storage circuit 66 according to the DC power supplied from a battery (not shown) in the vehicle 100 via the connector 70.

The first receiver 64 outputs the first ID code contained in the first signal input from the first antenna 12 to the control circuit 62. The second receiver 60 outputs the second ID code contained in the second signal input from the second antenna 14 to the control circuit 62.

The control circuit 62 determines whether the first ID code from the first receiver 64 and the first ID code stored in the storage circuit 66 match. When they match, the control circuit 62 outputs the determination to the ECU of the engine (not shown) and a steering lock 92 via the connector 70. The control circuit 62 also determines whether the second ID code from the second receiver 60 and the second ID code stored in the storage circuit 66 match. When they match, the control circuit 62 outputs the determination to a door lock device via the connector 70.

As has been described, the vehicle antenna device 10 is constructed such that the first antenna 12 is a communication antenna for the immobilizer system including the first transmitter 50, the first antenna 12, the first receiver 64, the control circuit 62, and the storage circuit 66, and that the second antenna 14 is a communication antenna for the keyless entry system including the second transmitter 56, the second antenna 14, the second receiver 60, and the door lock device.

The entire vehicle antenna device 10 is molded of an insulating resin 80 (see FIG. 5). As a result, the coil 20 of the first antenna 12 and the vertical part 30a of the second antenna 14 are insulated from each other having a space. In this case, a projection 84 of the resin 80 adjacent to the vertical part 30a is fixed to the key cylinder 46 with a screw 88. A projection 86 of the resin 80 adjacent to the board 16 is secured to the key cylinder 46 with a screw 90. Thus, the vehicle antenna device 10 is fixed to the key insertion opening 44 of the key cylinder 46 (see FIGS. 1, 2, 4, and 6).

The steering lock 92 is mounted to an end of the key cylinder 46 (see FIGS. 5 and 6). A steering column tube 96 through which a steering shaft 104 passes is fitted in a substantially arc-shaped recess 94 at the upper part of the steering lock 92 (above in FIG. 5). The steering shaft 104 is joined to a steering wheel 102. The steering shaft 104 and the steering column tube 96 are covered with the steering column 106 so as to be hidden from direct view by the driver. The steering column tube 96 fitted in the recess 94 is clamped between the steering lock 92 and a fixer frame 108 and retained with a screw 110. Referring to FIG. 6, the vehicle antenna device 10 and the key cylinder 46 are disposed on the side of the steering column 106. The key insertion opening 44 is exposed from the steering column 106.

The part of the steering column tube 96 which is in contact with the recess 94 has a hole (not shown). The steering lock 92 has a locking rod (not shown) passing through the hole from the recess 94 to push the side of the steering shaft 104 against the inner circumferential surface of the steering column tube 96 to lock the steering shaft 104.

The steering lock 92 retracts the locking rod that pushes the steering shaft 104 against the inner circumferential surface of the steering column tube 96 toward the steering lock 92 according to the comparison result on the first ID code obtained from the control circuit 62 via the connector 70. Thus, the pressure (lock) to the steering shaft 104 by the locking rod is released to enable the steering wheel 102 to rotate about the steering shaft 104.

The vehicle antenna device 10 according to the embodiment and the vehicle 100 equipped with the vehicle antenna device 10 basically are arranged as follows. The operation of the vehicle antenna device 10 and the vehicle 100 will be described hereinbelow with reference to FIGS. 1 to 6.

Here, we describe the case of unlocking the door of the vehicle 100 by the second transmitter 56 of the keyless entry system and the case of starting the engine of the vehicle 100 and releasing the lock of the steering shaft 104 by the first transmitter 50 of the immobilizer system.

When the driver of the vehicle 100 who carries the ignition key 42 and the remote controller 54 is present within a specified range from the vehicle 100 whose door is locked, the second signal is transmitted from the second transmitter 56 to the second antenna 14 in the vehicle 100 via the RF (314.9 MHz) radio waves 58. The second antenna 14 (the vertical part 30a and the horizontal part 30b) outputs the received second signal to the second receiver 60. The second receiver 60 outputs the second ID code contained in the input second signal to the control circuit 62. The control circuit 62 compares the input second ID code with the second ID code stored in the storage circuit 66. When they match, the control circuit 62 outputs the comparison result to the door lock device (not shown) via the connector 70. The door lock device unlocks the door of the vehicle 100 according to the comparison result.

The driver then opens the unlocked door and gets in the vehicle 100, and inserts the ignition key 42 into the key cylinder 46 through the key insertion opening 44 on the side of the steering column 106.

When the ignition key 42 is inserted into the key insertion opening 44, or when the ignition key 42 inserted in the key cylinder 46 is turned from the off-position to the ignition-on position (IGN ON) through an accessory (ACC) position, the first signal is transmitted from the first transmitter 50 to the first antenna 12 via the LF (from 100 kHz to 200 kHz) radio waves 52. The first antenna 12 outputs the received first signal to the first receiver 64. The first receiver 64 outputs the first ID code contained in the input first signal to the control circuit 62.

The control circuit 62 compares the input first ID code with the first ID code stored in the storage circuit 66. When they match, the control circuit 62 outputs the comparison result to the ECU (not shown) of the engine and the steering lock 92 via the connector 70. The ECU enables the engine to start according to the comparison result. The steering lock 92 retracts the locking rod to the steering lock 92 to release the lock of the steering shaft 104 according to the comparison result, thus enabling the steering wheel 102 connected to the steering shaft 104 to rotate.

When the first ID code and the second ID code do not match, respectively, the control circuit 62 does not output the comparison results and as such, the unlocking of the door, the starting of the engine, and the unlocking of the steering shaft 104 are not made.

In the conventional art, when the antenna unit serving as a receiving unit is constructed such that the first and second antennas are disposed close to each other to miniaturize the immobilizer system and the keyless entry system, the interference between the first and second antennas may degrade the communication performance of the first antenna.

This is because a magnetic field that is formed in the space between the first transmitter and the first antenna when the first signal is transmitted to the first antenna via LF radio waves from the first transmitter is disturbed by the metal second antenna disposed close to the first antenna. This makes it difficult to form a desired magnetic field in the space during the transmission of the first signal to restrict the communication region between the first transmitter and the first antenna, resulting in insufficient communication performance of the first antenna for receiving the first signal.

According to the embodiment of the present invention, the vehicle antenna device 10 is constructed such that part of the second antenna 14 is disposed along the first antenna 12 as the vertical part 30a, with the first antenna 12 and the vertical part 30a disposed coaxially along the central axis 40. The second antenna 14 is not disposed between the first transmitter 50 and the first antenna 12.

The second antenna 14 is not disposed between the first transmitter 50 and the first antenna 12. This arrangement prevents the magnetic field which is formed by transmitting the first signal from the first transmitter 50 to the first antenna 12 from being disturbed by the second antenna 14, allowing the first signal to be surely transmitted from the first transmitter 50 to the first antenna 12.

Accordingly, even if the first and second antennas 12 and 14 are arranged close to each other to reduce the size of the entire device, the communication performance of a device having only the first antenna 12 can be maintained.

The first antenna 12 and the vertical part 30*a* are arranged so as to surround the central axis 40 extending along the direction in which the ignition key 42 is to be inserted. This arrangement allows the first antenna 12 and the vertical part 30*a* to be housed compactly in the key cylinder 46, while ensuring sufficient communication performance of the first antenna 12 for receiving the first signal.

Furthermore, the outside diameters of the first antenna 12 and the vertical part 30*a* are substantially equal. This arrangement allows the first antenna 12 and the vertical part 30*a* to be housed compactly in the key cylinder 46, while further enhancing the communication performance of the first antenna 12 for receiving the first signal.

The first and second antennas 12 and 14 are electrically insulated from each other by the resin bobbin 22 and the resin 32, and the entire device is molded of the resin 80. This arrangement enables the first and second antennas 12 and 14 to be manufactured in the same module, thus miniaturizing the entire device. Thus, the number of work-hours and the cost of manufacturing the vehicle antenna device 10 can be reduced.

Furthermore, the second antenna 14 is made of a low magnetic permeability material. This further prevents the influence of the second antenna 14 on the magnetic field formed in the space between the first transmitter 50 and the first antenna 12 while the first signal is transmitted from the first transmitter 50 to the first antenna 12.

Since the first receiver 64, the second receiver 60, the control circuit 62, and the storage circuit 66 are disposed on the surface of one board 16, the entire device can be further miniaturized.

Since the vertical part 30*a* is arranged substantially perpendicular to the horizontal part 30*b*, the second signal can be surely received, improving the communication performance of the second antenna 14 for the reception of the second signal.

The vehicle antenna device 10 is constructed such that the first antenna 12 serves as a communication antenna for the immobilizer system including the first transmitter 50, the first antenna 12, the first receiver 64, the control circuit 62, and the storage circuit 66, and that the second antenna 14 serves as a communication antenna for the keyless entry system including the second transmitter 56, the second antenna 14, the second receiver 60, the control circuit 62, the storage circuit 66, and the door lock device. This arrangement can miniaturize the entire system including the immobilizer system and the keyless entry system, and improve the communication performance of the antennas in the immobilizer system and the keyless entry system.

The embodiments of the present invention has been described for the case in which the first antenna 12 is circular in shape, and part of the second antenna 14 is formed along the first antenna 12 as the vertical part 30*a*. Alternatively, the first antenna 12 may be in other shapes. For example, the first antenna 12 may be polygonal, such as triangular or rectangular, or elliptical, while part of the second antenna 14 may be shaped along the first antenna 12. Alternatively, the first antenna 12 and the vertical part 30*a* of the second antenna 14 may be in other shapes. For example, the first antenna 12 and the vertical part 30*a* may be polygonal, such as triangular or rectangular, or elliptical.

Obviously, numerous modifications and variations of the present invention are possible in light of the above teachings.

It is therefore to be understood that within the scope of the appended claims, the invention may be practiced otherwise than as specifically described herein.

What is claimed as new and is desired to be secured by Letters Patent of the United States is:

1. A vehicle antenna device comprising:
    a first antenna which surrounds an ignition key cylinder having a key insertion hole and which is configured to receive a first signal transmitted from a first transmitter in a key insertion state where a key is inserted into the key insertion hole; and
    a second antenna configured to receive a second signal transmitted from a second transmitter that exists outside a vehicle, the first antenna being positioned between the first transmitter and the second antenna in the key insertion state,
    wherein the second antenna comprises a vertical part and a horizontal part substantially perpendicular to the vertical part, the vertical part projects substantially perpendicularly from the horizontal part,
    wherein the first antenna and the vertical part of the second antenna are integrated as one part having an insulator which separates the first antenna and the vertical part, and
    wherein the first antenna and the vertical part of the second antenna have a cylindrical shape.

2. The vehicle antenna device according to claim 1, wherein the first antenna and the second antenna are arranged substantially coaxially with a center axis of the ignition key cylinder along a key insertion direction.

3. The vehicle antenna device according to claim 2, wherein the first antenna has a first cylindrical shape and the second antenna has a second cylindrical shape with a substantially same diameter of the first cylindrical shape.

4. The vehicle antenna device according to claim 1, wherein the second antenna is made of a material having low magnetic permeability.

5. The vehicle antenna device according to claim 1, wherein the first transmitter is provided in the key.

6. The vehicle antenna device according to claim 5, wherein the first signal is used for determining whether the key is authentic.

7. The vehicle antenna device according to claim 1, wherein the second signal is used for controlling a door locking unit.

8. A vehicle comprising:
    an ignition key cylinder having a key insertion hole;
    a first antenna surrounding the ignition key cylinder and configured to receive a first signal transmitted from a first transmitter in a key insertion state where a key is inserted into the key insertion hole; and
    a second antenna configured to receive a second signal transmitted from a second transmitter that exists outside a vehicle, the first antenna being positioned between the first transmitter and the second antenna in the key insertion state,
    wherein the second antenna comprises a vertical part and a horizontal part substantially perpendicular to the vertical part, the vertical part projects substantially perpendicularly from the horizontal part,
    wherein the first antenna and the vertical part of the second antenna are integrated as one part having an insulator which separates the first antenna and the vertical part, and
    wherein the first antenna and the vertical part of the second antenna have a cylindrical shape.

9. A vehicle security system comprising:
an ignition key cylinder having a key insertion hole;
a first transmitter configured to transmit a first signal;
a second transmitter configured to transmit a second signal;
a first antenna surrounding the ignition key cylinder and configured to receive the first signal transmitted from the first transmitter in a key insertion state where a key is inserted into the key insertion hole; and
a second antenna configured to receive the second signal transmitted from the second transmitter that exists outside a vehicle, the first antenna being positioned between the first transmitter and the second antenna in the key insertion state,
wherein the second antenna comprises a vertical part and a horizontal part substantially perpendicular to the vertical part, the vertical part projects substantially perpendicularly from the horizontal part,
wherein the first antenna and the vertical part of the second antenna are integrated as one part having an insulator which separates the first antenna and the vertical part, and
wherein the first antenna and the vertical part of the second antenna have a cylindrical shape.

10. The vehicle antenna device according to claim 1, further comprising a board upon which the first antenna and the second antenna are mounted,
wherein the horizontal part of the second antenna is disposed parallel with the board, and the vertical part is connected to the horizontal part and extends perpendicular to the board at an end of the board in a direction away from the board.

11. The vehicle according to claim 8, further comprising a board upon which the first antenna and the second antenna are mounted,
wherein the horizontal part of the second antenna is disposed parallel with the board, and the vertical part is connected to the horizontal part and extends perpendicular to the board at an end of the board in a direction away from the board.

12. The vehicle security system according to claim 9, further comprising a board upon which the first antenna and the second antenna are mounted,
wherein the horizontal part of the second antenna is disposed parallel with the board, and the vertical part is connected to the horizontal part and extends perpendicular to the board at an end of the board in a direction away from the board.

* * * * *